(12) United States Patent
Ma et al.

(10) Patent No.: US 12,543,981 B2
(45) Date of Patent: Feb. 10, 2026

(54) INTEGRATED CATHETER SYSTEM FOR BLOOD DRAW AT THE TIME OF PLACEMENT AND WITH ENABLING FEATURE FOR BLOOD DRAW DURING INDWELL

(71) Applicant: Becton, Dickinson and Company, Franklin Lakes, NJ (US)

(72) Inventors: Yiping Ma, Layton, UT (US); Jeff Charles O'Bryan, Murray, UT (US); Jonathan Karl Burkholz, Salt Lake City, UT (US); Curtis H. Blanchard, Herriman, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 502 days.

(21) Appl. No.: 18/093,618

(22) Filed: Jan. 5, 2023

(65) Prior Publication Data

US 2023/0210421 A1    Jul. 6, 2023

Related U.S. Application Data

(60) Provisional application No. 63/297,083, filed on Jan. 6, 2022.

(51) Int. Cl.
| *A61B 5/15* | (2006.01) |
| *A61M 25/00* | (2006.01) |
| *A61M 25/06* | (2006.01) |
| *A61M 39/10* | (2006.01) |

(52) U.S. Cl.
CPC .... *A61B 5/150992* (2013.01); *A61B 5/15003* (2013.01); *A61M 25/0097* (2013.01); *A61M 25/0606* (2013.01); *A61M 39/1011* (2013.01); *A61M 2039/1077* (2013.01)

(58) Field of Classification Search
None
See application file for complete search history.

(56) References Cited

U.S. PATENT DOCUMENTS

| 6,719,717 B1 * | 4/2004 | Johnson | A61M 1/36 604/9 |
| 2014/0276651 A1 * | 9/2014 | Schultz | A61M 39/1011 53/425 |
| 2019/0021640 A1 * | 1/2019 | Burkholz | A61B 5/153 |
| 2019/0321595 A1 | 10/2019 | Spataro et al. | |

(Continued)

*Primary Examiner* — Duane N Taylor, Jr.
(74) *Attorney, Agent, or Firm* — The Webb Law Firm

(57) ABSTRACT

An integrated peripheral intravenous (IV) catheter configured for blood draw both at the time of catheter placement and during catheter indwell. The peripheral IV catheter includes a catheter adapter having a catheter configured to be inserted into a patient's vasculature and a side inlet defining a fluid pathway into and out of the catheter. The peripheral IV catheter also includes a side port member having a main branch, the main branch including a distal end configured to couple the side port member to the side inlet of the catheter adapter and a connector portion accessible via a proximal end of the main branch. Additionally, the peripheral IV catheter includes a blood collection adapter removably and directly coupled to the connector portion of the side port member at the proximal end of the main branch. Furthermore, side pore member of the peripheral IV catheter may include a side branch.

20 Claims, 7 Drawing Sheets

(56) References Cited

U.S. PATENT DOCUMENTS

| | | |
|---|---|---|
| 2020/0170559 A1 | 6/2020 | Burkholz et al. |
| 2020/0330722 A1 | 10/2020 | Spataro et al. |
| 2021/0068732 A1 | 3/2021 | Yan et al. |
| 2021/0128037 A1 | 5/2021 | Burkholz et al. |
| 2021/0186394 A1 | 6/2021 | Ma et al. |
| 2021/0228127 A1 | 7/2021 | Burkholz et al. |
| 2021/0275069 A1 | 9/2021 | Ma et al. |
| 2021/0393924 A1 | 12/2021 | Burkholz et al. |

* cited by examiner

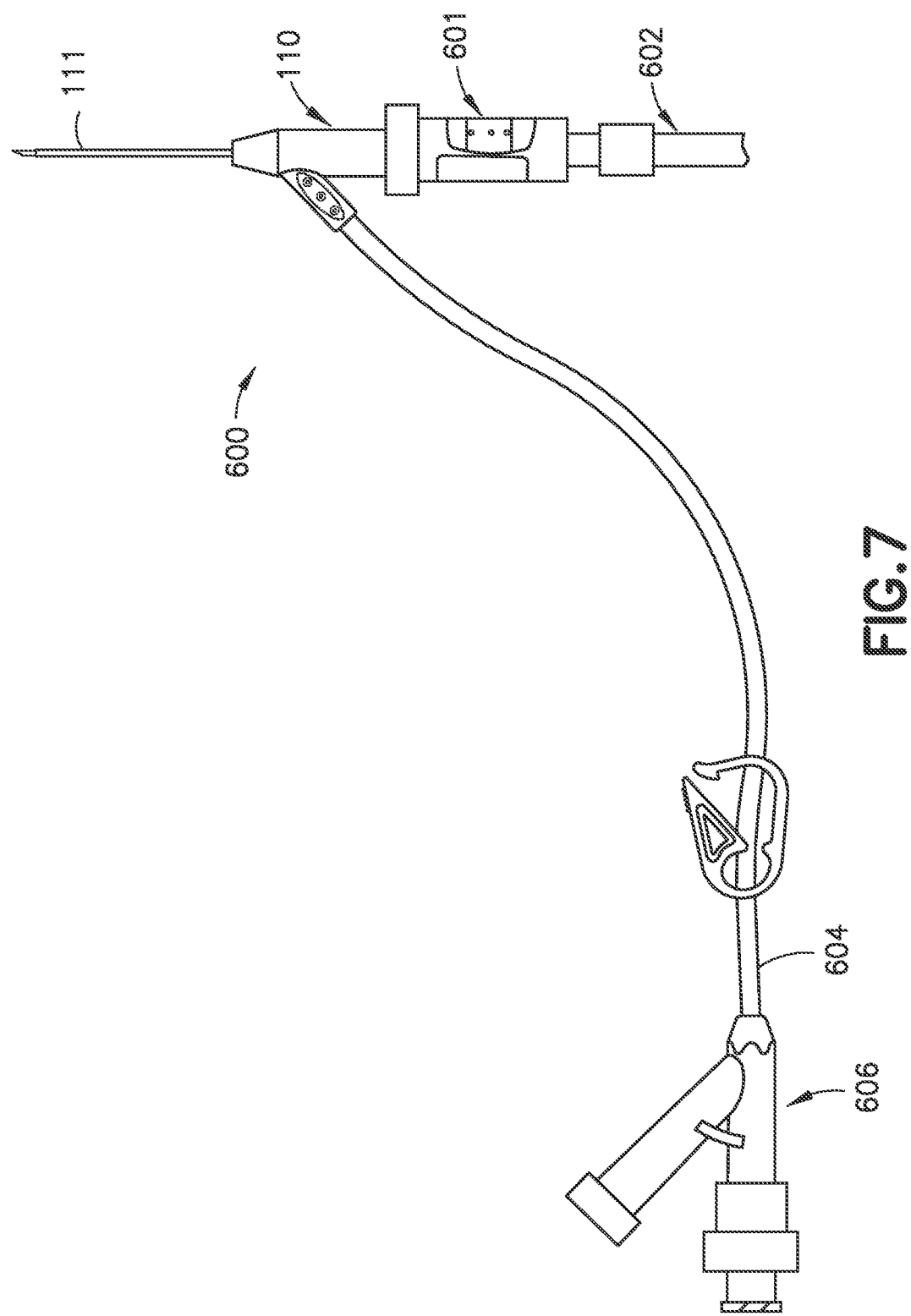

INTEGRATED CATHETER SYSTEM FOR BLOOD DRAW AT THE TIME OF PLACEMENT AND WITH ENABLING FEATURE FOR BLOOD DRAW DURING INDWELL

CROSS-REFERENCE TO RELATED APPLICATION

The present application claims priority to U.S. Provisional Application No. 63/297,083, entitled "An Integrated Catheter System for Blood Draw at the Time of Placement and with Enabling Feature for Blood Draw During Indwell", filed Jan. 6, 2022, the entire disclosure of which is hereby incorporated by reference in its entirety.

BACKGROUND OF THE INVENTION

Field of the Invention

The present disclosure generally relates to a blood collection adapters and related assemblies, systems, and methods for us with a peripheral intravenous catheter (PIVC). The adapters are configured to allow for blood collection via a PIVC both at the time of catheter placement and during catheter indwell.

Description of Related Art

A catheter is commonly used to infuse fluids into vasculature of a patient. For example, the catheter may be used for infusing normal saline solution, various medicaments, or total parenteral nutrition. Furthermore, the catheter may also be used for withdrawing blood from the patient.

The catheter may be an over-the-needle peripheral intravenous catheter (PIVC). In this case, the catheter may be mounted over an introducer needle having a sharp distal tip. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient. After proper placement of the needle, the clinician may temporarily occlude flow in the vasculature and remove the needle, leaving the catheter in place (i.e., "indwelled") for future blood withdrawal and/or fluid infusion.

While PIVCs may be used for blood withdrawal, they are not typically designed and optimized for such purposes. For example, failure rates for aspiration can reach 20-50% when PIVCs have been left inserted for more than a day. Furthermore, blood extracted from PIVCs is often hemolyzed, which is defined as the rupture of red blood cells and the release of their contents into surrounding fluid, resulting in the need to discarded sample(s) and repeat the blood collection procedure.

Several factors may contribute to the challenges associated with extracting blood through a PIVC. First, most catheters are formed from a soft bio-reactive polymer, which can lead to a potential narrowing or collapse of the catheter as the negative pressure is applied for aspiration. Additionally, longer indwelling times can increase debris (e.g., fibrin/platelet clots) that builds up on the tip of the catheter and within the lumen of the catheter and/or PIVC. Similarly, such debris can at least partially occlude the lumen of the vein in which the PIVC is placed. In some instances, this debris (e.g., fibrin/platelet clots) around the PIVC can lead to reduced blood flow within portions of the vein surrounding the inserted PIVC (e.g., both upstream and downstream), resulting in improper and/or inefficient aspiration. Another barrier is attributed to a "suction cup" effect, wherein the negative pressure created by aspiration through the catheter and the possible curved path of a vein results in the tip of the catheter adhering to the wall of the vein.

In view of the challenges related to blood extraction from PIVCs over prolonged indwelling periods, fluid transfer devices have been developed to mitigate the possibility of catheter collapse, reduced blood flow due to debris built up on or within the catheter, etc. One such device, PIVO™ from Velano Vascular, Inc., is configured as a single-use device which temporarily attaches to a PIVC to draw a blood sample. Using an existing peripheral intravenous line as a conduit to the vasculature, the PIVO™ device advances a flexible, internal flow tube through the PIVC, beyond the catheter tip, and into the vein to collect a blood sample. This flow tube is designed to extend beyond the suboptimal draw conditions around the indwelling line to reach vein locations where blood flow is optimal for aspiration. Once blood collection is complete, the flow tube is retracted, and the device is removed from the PIVC and discarded.

In order to accommodate the PIVO™ device, PIVCs having an integrated extension set have been developed. These "integrated PIVCs" typically may include extension tubing that is integrated at one end into a catheter adapter, an access port (e.g., a luer connector) coupled to the other end, and a side port to facilitate blood draw. One such integrated PIVC is disclosed in U.S. patent application Ser. No. 17/143, 979, which is incorporated herein by reference in its entirety.

However, while such an integrated PIVC is capable of accommodating a blood draw device (such as PIVO™) to be used with indwelled catheters (i.e., blood draw at some period of time after catheter placement), these integrated PIVCs are not configured to be usable with pre-attached blood collection systems having an optimized fluid path for blood collection at the time of catheter placement. To accommodate such blood collection at the time of catheter placement, another type of integrated PIVC having a pre-attached blood collection device has been developed. One such integrated PIVC is disclosed in U.S. Provisional Patent Application No. 63/138,174, which is also incorporated herein by reference in its entirety. However, the pre-attached blood collection device shown and described with respect to U.S. Provisional Patent Application No. 63/138,174 utilizes an elongated extension tube set. Accordingly, while the integrated PIVC of U.S. Provisional Patent Application No. 63/138,174 is configured to enable blood collection at the time of catheter placement, the elongated extension tube set would not easily accommodate use with, e.g., the PIVO™ device for later blood collection during catheter indwell.

SUMMARY OF THE INVENTION

Accordingly, the present disclosure generally relates to a blood collection/draw adapters and related assemblies, systems, and methods. The adapters are configured to allow for blood collection via a PIVC both at the time of catheter placement and during catheter indwell.

In accordance with an aspect of the present disclosure, an integrated peripheral intravenous catheter (PIVC) is disclosed. The integrated PIVC includes a catheter adapter having a catheter configured to be inserted into a patient's vasculature, and a side inlet defining a fluid pathway into and out of the catheter. The PIVC also includes a side port member having a main branch, the main branch including a distal end configured to couple the side port member to the side inlet of the catheter adapter and a connector portion accessible via a proximal end of the main branch. The PIVC also includes a blood collection adapter removably and directly coupled to the connector portion of the side port member at the proximal end of the main branch.

In some embodiments, the PIVC also includes a luer lock access device coupled to the blood collection adapter.

In some embodiments, the luer lock access device includes a needle assembly and blood collection container holder.

In some embodiments, the connector portion is configured as a needle-free connector.

In some embodiments, the connector portion is configured as a pro re nata (PRN) connector.

In some embodiments, the main branch of the side port member provides a fluid pathway for drawing blood from the patient's vasculature.

In some embodiments, the side port member further includes a side branch.

In some embodiments, the PIVC further includes an extension set coupled to the side port member via the side branch.

In some embodiments, the main branch of the side port member provides a first fluid pathway for drawing blood from a patient's vasculature and the side branch of the side port member provides a second fluid pathway for injecting fluids into the patient's vasculature.

In some embodiments, the blood collection adapter comprises a fluid pathway having a non-linear portion.

In some embodiments, the non-linear portion is one of a coil shape or an S-shape.

In some embodiments, the blood collection adapter is coupled to an extension tube and an access port.

In some embodiments, the blood collection adapter is directly coupled to a blood collection device.

In some embodiments, the blood collection device includes a needle assembly having a needle configured to receive a blood collection container.

In accordance with another aspect of the present disclosure, an integrated peripheral intravenous catheter (PIVC) is disclosed. The PIVC includes a catheter adapter having a catheter configured to be inserted into a patient's vasculature, and a side inlet defining a fluid pathway into and out of the catheter. The PIVC also includes a side port member having a main branch having a distal end configured to couple the side port member to the side inlet of the catheter adapter and a connector portion accessible via a proximal end of the main branch, and a side branch. The PIVC also includes a blood collection adapter directly coupled to the connector portion of the side port member at the proximal end of the main branch.

In some embodiments, the main branch of the side port member provides a first fluid pathway for drawing blood from a patient's vasculature and the side branch of the side port member provides a second fluid pathway for injecting fluids into the patient's vasculature.

In some embodiments, the blood collection adapter is configured to allow for drawing of blood from a patient's vasculature at the time of catheter placement.

In some embodiments, the blood collection adapter is selectively removable from the connector portion of the main branch of the side port member.

In some embodiments, the PIVC further includes a luer lock access device coupled to the blood collection adapter.

In some embodiments, the blood collection adapter includes a fluid pathway having a non-linear portion.

Further details and advantages of the invention will become clear upon reading the following detailed description in conjunction with the accompanying drawing figures, wherein like parts are designated with like reference numerals throughout.

BRIEF DESCRIPTION OF THE DRAWINGS

FIG. 7 illustrates an integrated PIVC having a blood draw adapter in-line with a catheter in accordance with another aspect of the present disclosure.

DESCRIPTION OF PREFERRED EMBODIMENTS

Figure 1:
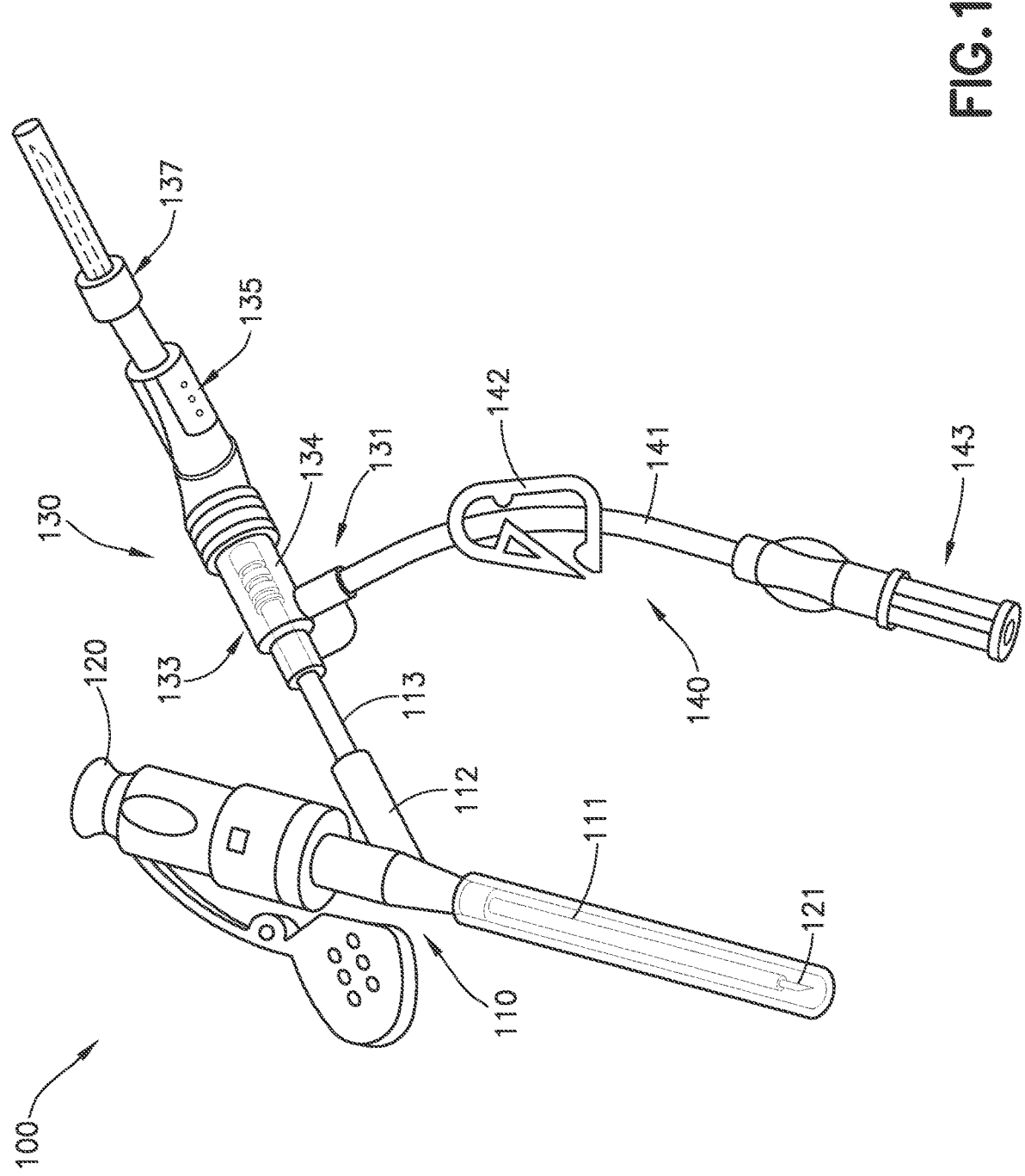
FIG. 1 illustrates an integrated PIVC having a multi-branch side port member and blood collection adapter in accordance with an aspect of the present disclosure.

The following description is provided to enable those skilled in the art to make and use the described aspects contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present disclosure.

For the purposes of the description hereinafter, the terms "upper", "lower", "right", "left", "vertical", "horizontal", "top", "bottom", "lateral", "longitudinal", and derivatives thereof shall relate to the invention as it is oriented in the drawings. However, it is to be understood that the invention may assume various alternative variations, except where expressly specified to the contrary. It is also to be understood that the specific devices illustrated in the attached drawings, and described in the following specification, are simply exemplary aspects of the invention. Hence, specific dimensions and other physical characteristics related to the aspects disclosed herein are not to be considered as limiting.

Embodiments of the present disclosure will primarily be described in the context of integrated PIVCs. However, embodiments of the present disclosure equally extend to other integrated IV catheters. Accordingly, the techniques of the present disclosure can be applied to any type of integrated IV catheter. For purposes of the specification and the claims, an integrated IV catheter should be construed as an IV catheter that includes an integrated extension set.

Referring to FIG. 1, a PIVC 100 in accordance with an aspect of the present disclosure is shown. PIVC 100 includes a catheter adapter 110 from which a catheter 111 distally extends and a needle assembly 120 from which a needle 121 distally extends. Prior to insertion, needle assembly 120 is coupled to catheter adapter 110 to cause the needle to extend distally from catheter 111. The catheter adapter 110 also includes a side inlet 112 which defines a fluid pathway into (and out of) the catheter 111. The precise configuration and function of catheter adapter 110 and/or needle assembly 120 are not essential to the present disclosure, and any suitable configuration and/or interaction of these components may be employed.

PIVC 100 also includes a side port member 130. The side port member 130 has two fluid pathways comprising a main branch 133 and a side branch 131. The main branch 133 is coupled to the side inlet 112 of catheter adapter 110 via intermediate tubing 113. However, in some embodiments, it is to be understood that main branch 133 may be coupled directly to side inlet 112, thereby obviating the need for intermediate tubing 113.

The side branch 131 is configured couple an extension set 140 with the side port member 130. As depicted, extension set 140 includes extension tubing 141 that extends between side branch 131 and an access port 143, and may include a pinch clamp 142 for occluding extension tubing 141. It is noted, however, that many different types and configurations of extension sets could be used. In this way, extension set 140 provides a means of fluid infusion via the PIVC 100.

Unlike side branch 131, main branch 133 of side port member 130 is not coupled to elongated extension tubing. Rather, main branch 133 incorporates a connector portion 134 configured as, e.g., a needle-free connector such as the SMARTSITE™ needle-free connector from Becton Dickinson & Company. However, it is to be understood that connector portion 134 may be any appropriate needle-free connector.

Referring still to FIG. 1, connector portion 134 is configured for direct coupling to a variety of devices utilized in blood draw via the PIVC 100. For example, as shown in FIG. 1, a blood collection adapter 135 may be removably coupled to the connector portion 134, with the blood collection adapter 135 being coupled to a luer lock access device 137 such as, e.g., the VACUTAINER® LUER-LOK™ ACCESS DEVICE from Becton Dickinson & Company. The luer lock access device 137 may include a needle assembly and blood collection container holder (not shown) to allow for quick blood draw into a blood collection tube (e.g., a VACUTAINER® blood collection tube) at the time of catheter placement.

However, as noted above, the efficacy of blood collection via an indwelling catheter may diminish over time due to several factors such as, e.g., the possibility of catheter collapse, reduced blood flow due to debris built up on or within the catheter, etc. Thus, when it is desirable to draw blood via an indwelling catheter at any time other than immediately (or relatively soon) after catheter insertion, use of a device such as, e.g., a PIVO™ needle-less blood draw device is greatly beneficial, as it is configured to bypass any potential debris build up or other issues relating to the indwelling catheter.

As such, in accordance with an aspect of the present disclosure, not only is side port member 130 of PIVC 100 configured to allow for blood draw at the time of catheter insertion, as described above, but the connector portion 134 further allows for coupling to a device such as, e.g., a PIVO™ needle-less blood draw device for blood draw via the indwelling catheter at any time after catheter insertion. That is, the connector portion 134 of side port member 130 allows for the selective coupling and removal of various blood draw devices, not only including the blood collection adapter 135 and luer lock access device 137 as shown in FIG. 1, but also other devices such as a PIVO™ needle-less blood draw device. In the case of a PIVO™ needle-less blood draw device, which utilizes a flexible, internal flow tube configured to advance through the PIVC 100 and beyond the tip of catheter 111, the connection of the main branch 133 of side port member 130 to the side inlet 112 of catheter adapter 110 via a short length of intermediate tubing 113 allows for effective passage the flexible, internal flow tube through the catheter 111. Conversely, if a conventional, longer extension tube were used to couple the main branch 133 to the side inlet 112, such passage of the flexible, internal flow tube of the PIVO™ needle-less blood draw device through the catheter 111 would not be possible.

Figure 2:
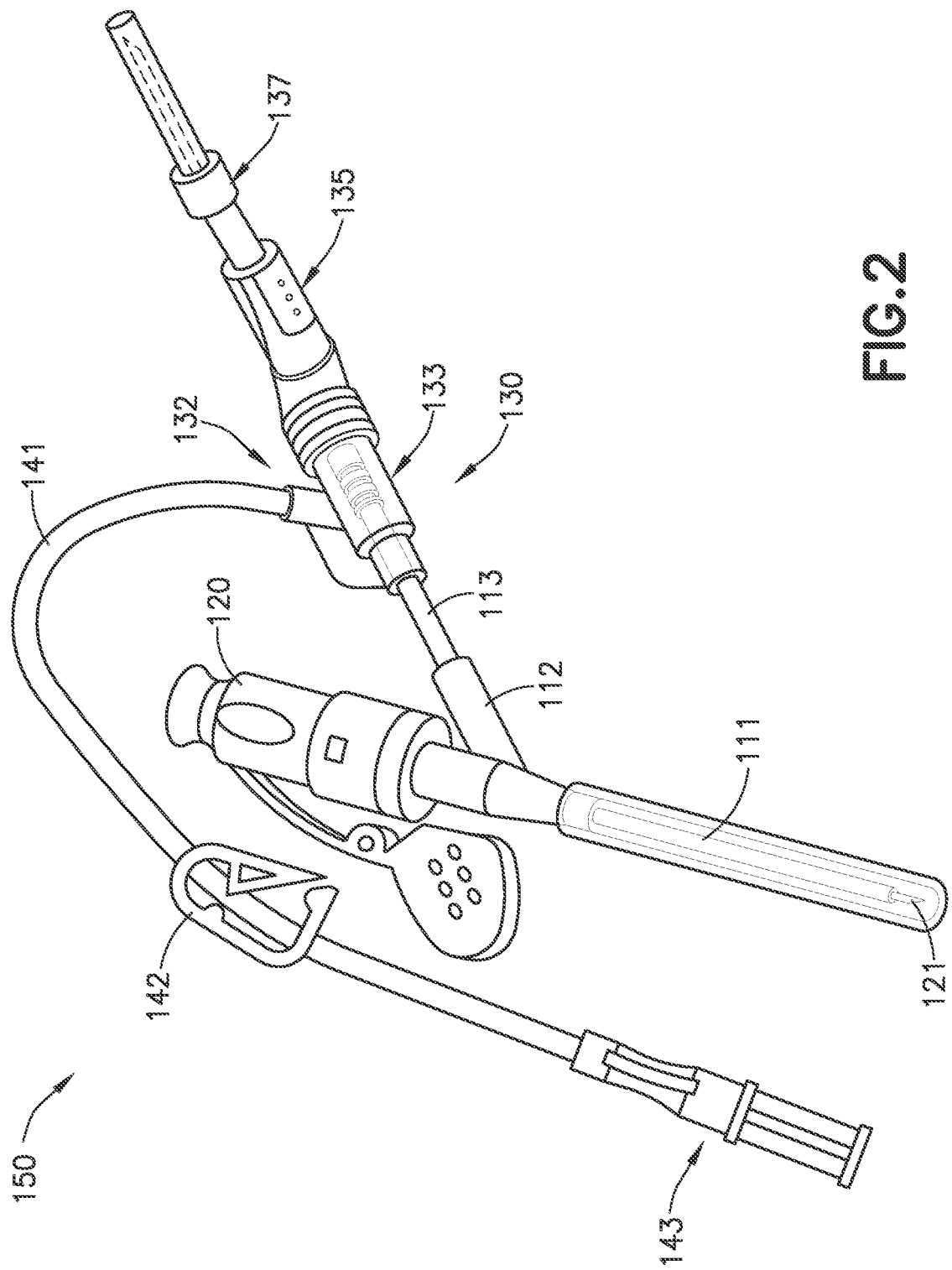
FIG. 2 illustrates an integrated PIVC having a multi-branch side port member and blood collection adapter in accordance with another aspect of the present disclosure.

Referring now to FIG. 2, a PIVC 300 in accordance with another aspect of the present disclosure is shown. PIVC 150 is substantially similar to PIVC 100 described above with respect to FIG. 1. As such, the purpose of components having common reference numbers between PIVC 100 and PIVC 150 will not be reiterated herein. However, while PIVC 100 included a side branch 131 oriented substantially perpendicularly to the main branch 133 of side port member 130, PIVC 150 includes a side branch 132 having a distally-directed orientation relative to the side port member 130. The side branch 132 is coupled to extension tubing 141 that extends between side branch 131 and an access port 143, and may include a pinch clamp 142 for occluding extension tubing 141. As such, while the overall purpose and effect is the same as PIVC 100 described above, PIVC 150 shown in FIG. 2 illustrates that the side port member 130 may be configured in a variety of ways, yet still allow for blood draw both at the time of catheter placement and during catheter indwell.

Figure 3:
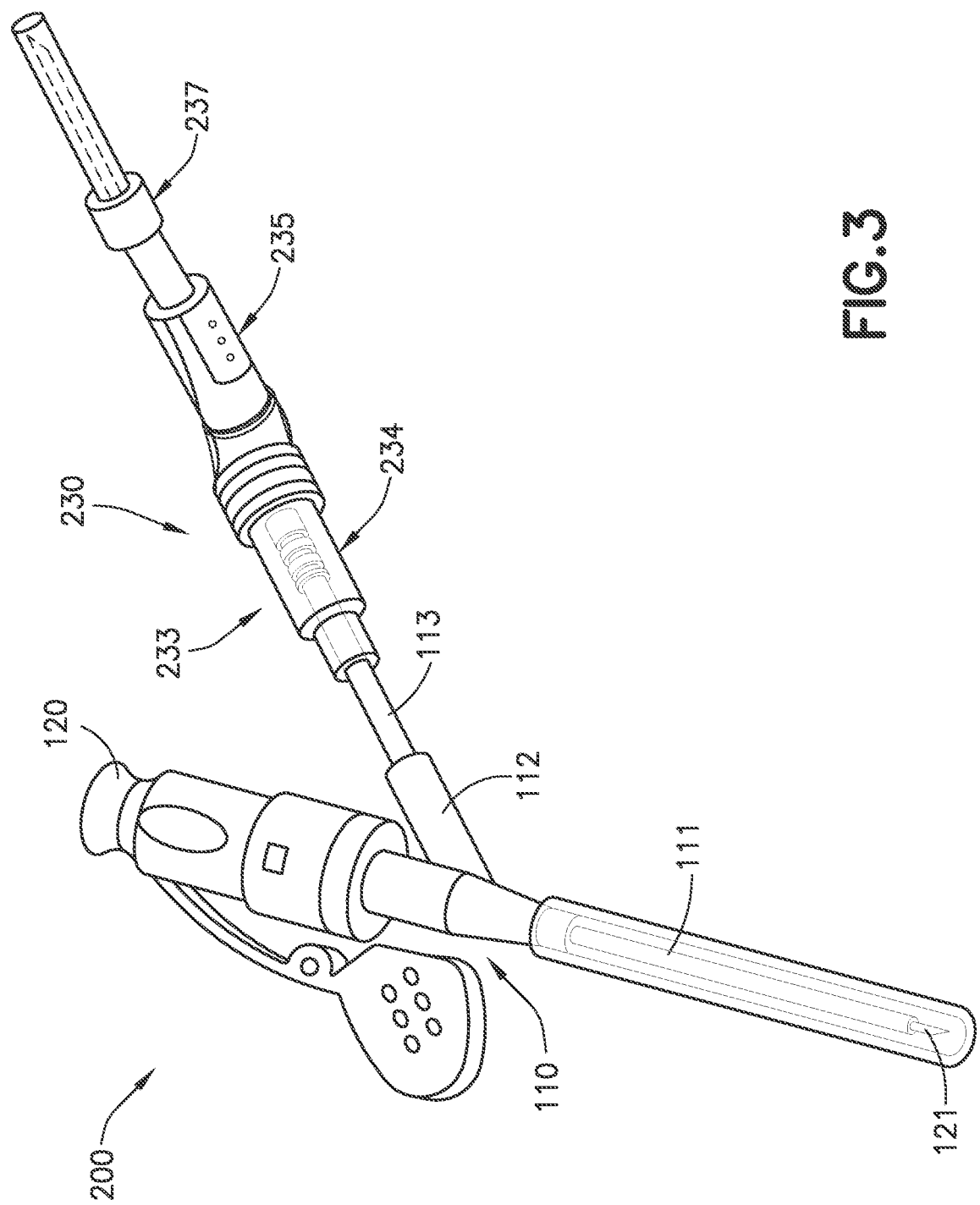
FIG. 3 illustrates an integrated PIVC having a single-branch side port member and blood collection adapter in accordance with another aspect of the present disclosure.

Next, referring to FIG. 3, a PIVC 200 in accordance with another aspect of the present disclosure is illustrated. Similar to PIVC 100 described above, PIVC 200 includes a catheter adapter 110 from which a catheter 111 distally extends and a needle assembly 120 from which a needle 121 distally extends. Prior to insertion, needle assembly 120 is coupled to catheter adapter 110 to cause the needle to extend distally from catheter 111. The catheter adapter 110 also includes a side inlet 112 which defines a fluid pathway into (and out of) the catheter 111. The precise configuration and function of catheter adapter 110 and/or needle assembly 120 are not essential to the present disclosure, and any suitable configuration and/or interaction of these components may be employed.

PIVC 200 also includes a side port member 230. However, unlike side port member 130 of PIVC 100, side port member 230 has only a single fluid pathway comprising a branch 233. The branch 233 is coupled to the side inlet 112 of catheter adapter 110 via intermediate tubing 113. However, in some embodiments, it is to be understood that branch 233 may be coupled directly to side inlet 112, thereby obviating the need for intermediate tubing 113.

In one embodiment, branch 233 of side port member 230 incorporates a connector portion 234 configured as, e.g., a needle-free connector such as the SMARTSITE™ needle-free connector from Becton Dickinson & Company. However, it is to be understood that connector portion 234 may be any appropriate needle-free connector. The connector portion 234 is configured for direct coupling to a variety of devices utilized in blood draw via the PIVC 200. For example, as shown in FIG. 2, a blood collection adapter 235 may be removably coupled to the connector portion 234, with the blood collection adapter 235 being coupled to a luer lock access device 237 such as, e.g., the VACUTAINER®

LUER-LOK™ ACCESS DEVICE from Becton Dickinson & Company. The luer lock access device 237 may include a needle assembly and blood collection container holder (not shown) to allow for quick blood draw into a blood collection tube (e.g., a VACUTAINER® blood collection tube) at the time of catheter placement.

Furthermore, in addition to accommodating blood draw at the time of catheter insertion, the connector portion 234 also allows for coupling to a device such as, e.g., a PIVO™ needle-less blood draw device for blood draw via the indwelling catheter at any time after catheter insertion. That is, the connector portion 234 of side port member 230 allows for the selective coupling and removal of various blood draw devices, including the blood collection adapter 235 and luer lock access device 237 as shown in FIG. 2, as well as other devices such as a PIVO™ needle-less blood draw device (not shown). In the case of a PIVO™ needle-less blood draw device, which utilizes a flexible, internal flow tube configured to advance through the PIVC 200 and beyond the tip of catheter 111, the connection of the branch 233 of side port member 230 to the side inlet 112 of catheter adapter 110 via a short length of intermediate tubing 113 allows for effective passage the flexible, internal flow tube through the catheter 111.

Referring still to FIG. 3, it is to be understood that connector portion 234 is not limited to a needle-free connector such as the SMARTSITE™ needle-free connector from Becton Dickinson & Company. Instead, in accordance with another aspect of the present disclosure, connector portion 234 be configured as a pro re nata (PRN) connector commonly utilized in some markets. In instances where connector portion 234 is configured as a PRN connector, the blood collection adapter 235 may be configured to include a sharp cannula suitable to penetrate the PRN connector during blood draw at the time of catheter placement. Furthermore, for blood draw after catheter placement (i.e., during catheter indwell) utilizing, e.g., a PIVO™ needle-less blood draw device, a blunt cannula/internal flow tube commonly provided on the device may be replaced with a sharpened cannula to allow for penetration of the PRN connector by the cannula/internal flow tube as it is fed through the side port member 230 and, eventually, through the catheter 111.

Figure 4:
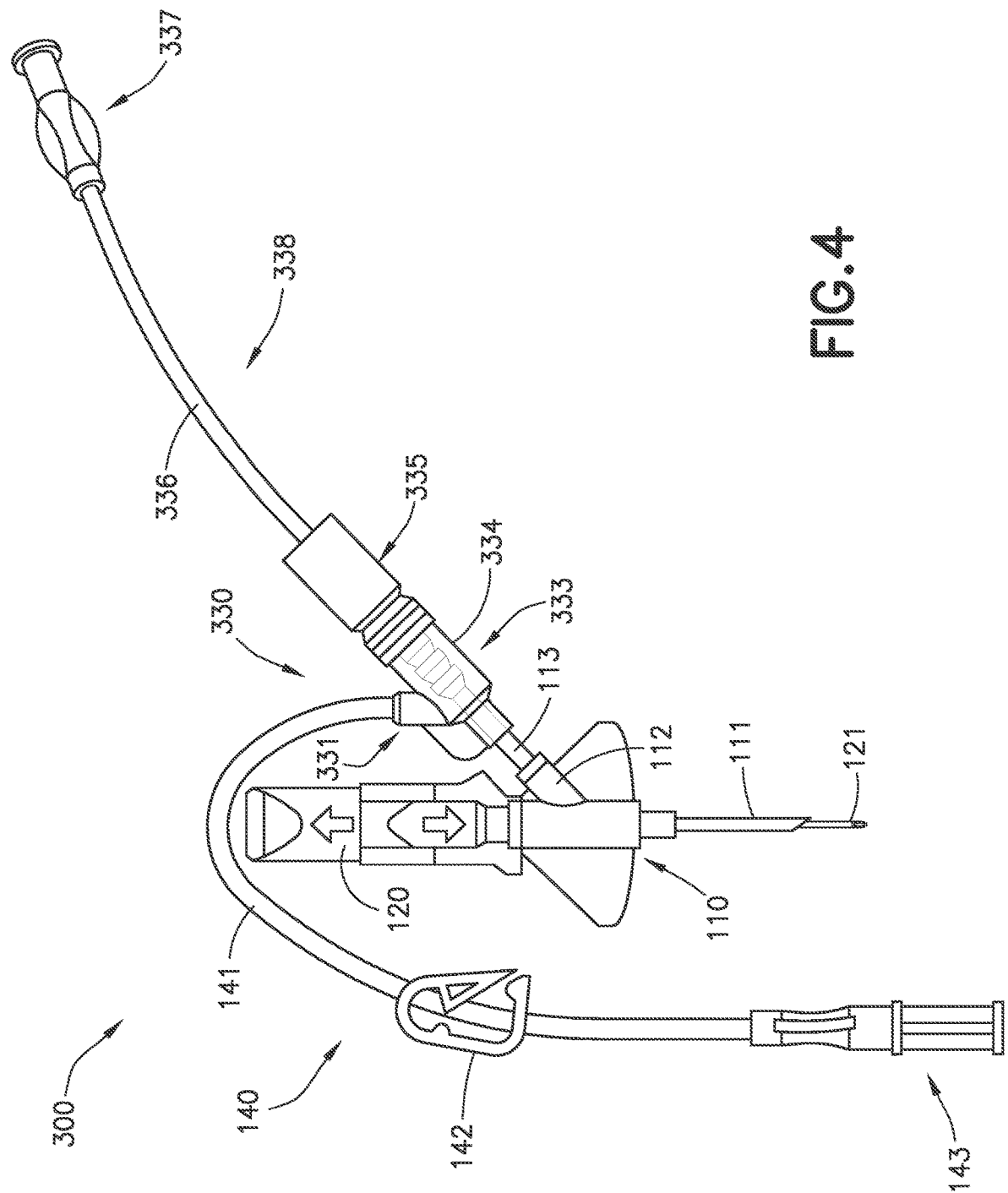
FIG. 4 illustrates an integrated PIVC having a multi-branch side port member and blood collection adapter with a non-linear fluid passage in accordance with another aspect of the present disclosure.

Next, referring to FIG. 4, a PIVC 300 in accordance with another aspect of the present disclosure is illustrated. Similar to PIVCs 100, 150, 200 described above with respect to FIGS. 1-3, PIVC 300 includes a catheter adapter 110 from which a catheter 111 distally extends and a needle assembly 120 from which a needle 121 distally extends. Prior to insertion, needle assembly 120 is coupled to catheter adapter 110 to cause the needle to extend distally from catheter 111. The catheter adapter 110 also includes a side inlet 112 which defines a fluid pathway into (and out of) the catheter 111. The precise configuration and function of catheter adapter 110 and/or needle assembly 120 are not essential to the present disclosure, and any suitable configuration and/or interaction of these components may be employed.

PIVC 300 also includes a side port member 330. The side port member 330 has two fluid pathways comprising a main branch 333 and a side branch 331. The main branch 333 is coupled to the side inlet 112 of catheter adapter 110 via intermediate tubing 113. However, in some embodiments, it is to be understood that main branch 333 may be coupled directly to side inlet 112, thereby obviating the need for intermediate tubing 113.

The side branch 331 is configured couple an extension set 140 with the side port member 330. As depicted, extension set 140 includes extension tubing 141 that extends between side branch 131 and an access port 143, and may include a pinch clamp 142 for occluding extension tubing 141. It is noted, however, that many different types and configurations of extension sets could be used. In this way, extension set 140 provides a means of fluid infusion via the PIVC 300.

Unlike side branch 331, main branch 333 of side port member 330 is not coupled to elongated extension tubing. Rather, main branch 333 incorporates a connector portion 334 configured as, e.g., a needle-free connector such as the SMARTSITE™ needle-free connector from Becton Dickinson & Company. However, it is to be understood that connector portion 334 may be any appropriate needle-free connector, a PRN connector, etc.

Referring still to FIG. 4, connector portion 334 is configured for direct coupling to a variety of devices utilized in blood draw via the PIVC 300. However, unlike FIGS. 1-3 above, where a blood collection adapter and luer lock access device were utilized for blood draw at the time of catheter insertion, PIVC 300 utilizes a blood draw extension set 338 specifically configured to reduce a likelihood of hemolysis during blood collection using the PIVC 300. Extension set 338 includes an adapter 335, with adapter 335 configured to be coupled to connector portion 334. An example of adapter 335 and related componentry is shown and described in further detail in U.S. patent application Ser. No. 17/146,388, which is incorporated herein by reference in its entirety.

In some embodiments, the adapter 335 includes a distal end coupled to the connector portion 334 and a proximal end configured to couple to a blood collection device (not shown) via an extension tube 336 and access port 337. The adapter 335 includes a fluid pathway disposed between the distal end and the proximal end thereof, with the fluid pathway having a non-linear portion. Blood cells may experience shear stress as they flow through the fluid pathway of adapter 335. The maximum shear stress is along the wall of the blood cell, or wall shear stress. Wall shear stress on blood cells is considered a major source of mechanical damage to blood cells. In some embodiments, the non-linear portion of adapter 335 may facilitate increased flow resistance within the PIVC 300 to distribute the pressure differential and reduce shear stress experienced by red blood cells.

In some embodiments, the non-linear portion of adapter 335 may form a coil (or spiral) shape, an S-shape, or another suitable non-linear shape. Furthermore, in some embodiments, the non-linear portion may increase a length of the fluid pathway through the adapter 335, and thereby may increase flow resistance and decrease blood flow within the adapter 335. In these embodiments, a risk of hemolysis during blood collection may be reduced.

In some embodiments, the fluidic resistance may be provided through carefully selecting the length and diameter of the extension tube 336. The increased flow resistance would decrease the blood flow rate within the entire fluid path through the PIVC 300. In these embodiments, a risk of hemolysis during blood collection may be reduced.

The adapter 335, together with extension tube 336 and access port 337, may be removably coupled to the connector portion 334, with any appropriate blood collection device being couplable to access port 337 to allow for quick blood draw at the time of catheter placement. Furthermore, in addition to accommodating blood draw at the time of catheter insertion via the removable adapter 335, the connector portion 334 also allows for coupling to a device such as, e.g., a PIVO™ needle-less blood draw device for blood draw via the indwelling catheter at any time after catheter insertion. In the case of a PIVO™ needle-less blood draw device, which utilizes a flexible, internal flow tube configured to advance through the PIVC 300 and beyond the tip of catheter 111, the connection of the branch 333 of side port member 230 to the side inlet 112 of catheter adapter 110 via a short length of intermediate tubing 113 allows for effective passage the flexible, internal flow tube through the catheter 111.

Figure 5:
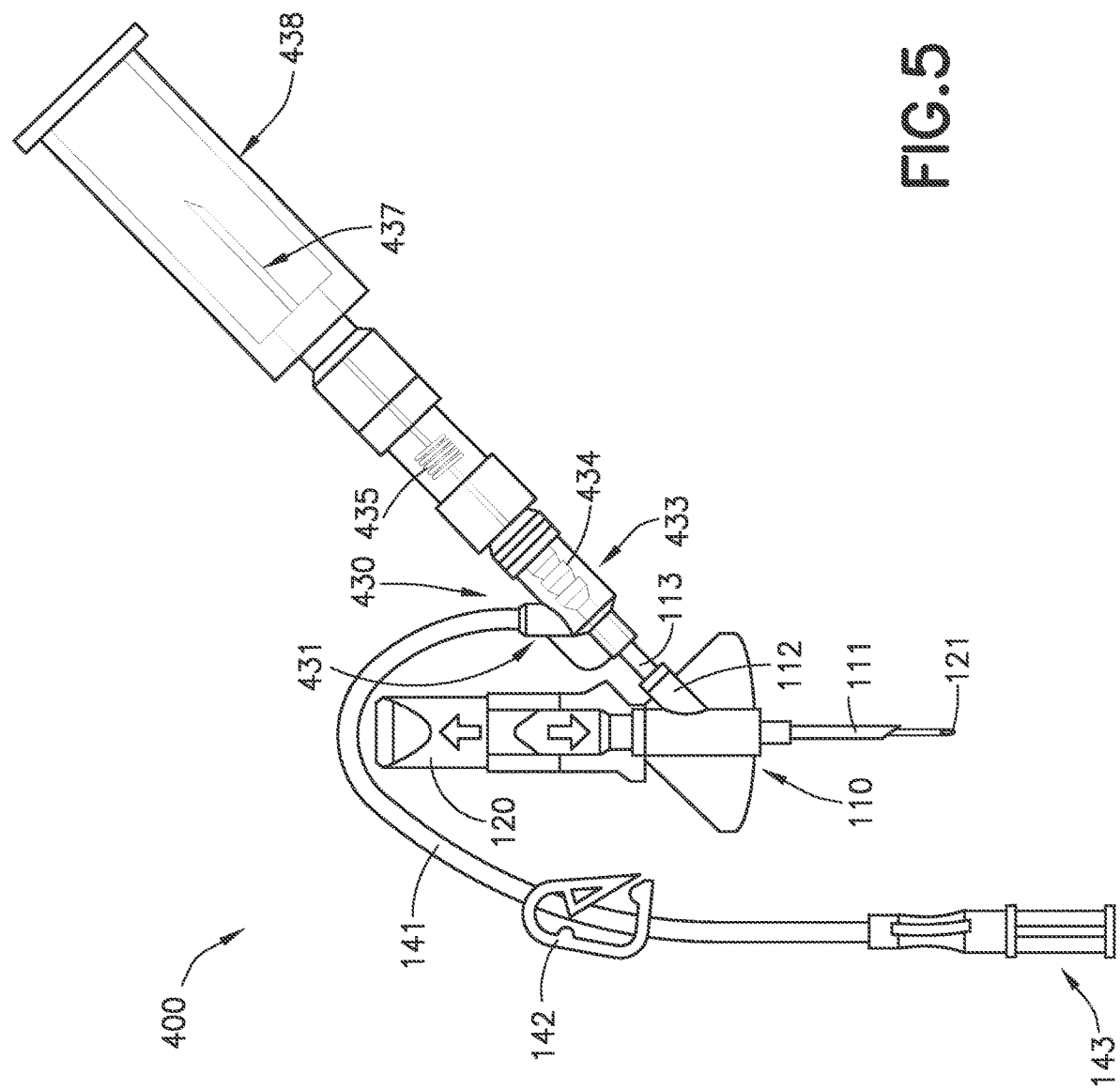
FIG. 5 illustrates an integrated PIVC having a multi-branch side port member and blood collection adapter with a non-linear fluid passage in accordance with another aspect of the present disclosure.

Referring now to FIG. 5, a PIVC 400 in accordance with another aspect of the present disclosure is illustrated. Similar to PIVCs 100, 150, 200, 300 described above with respect to FIGS. 1-4, PIVC 400 includes a catheter adapter 110 from which a catheter 111 distally extends and a needle assembly 120 from which a needle 121 distally extends. Prior to insertion, needle assembly 120 is coupled to catheter adapter 110 to cause the needle to extend distally from catheter 111. The catheter adapter 110 also includes a side inlet 112 which defines a fluid pathway into (and out of) the catheter 111. The precise configuration and function of catheter adapter 110 and/or needle assembly 120 are not essential to the present disclosure, and any suitable configuration and/or interaction of these components may be employed.

PIVC 400 also includes a side port member 430. The side port member 430 has two fluid pathways comprising a main branch 433 and a side branch 431. The main branch 433 is coupled to the side inlet 112 of catheter adapter 110 via intermediate tubing 113. However, in some embodiments, it is to be understood that main branch 433 may be coupled directly to side inlet 112, thereby obviating the need for intermediate tubing 113.

The side branch 431 is configured couple an extension set 140 with the side port member 430. As depicted, extension set 140 includes extension tubing 141 that extends between side branch 131 and an access port 143, and may include a pinch clamp 142 for occluding extension tubing 141. It is noted, however, that many different types and configurations of extension sets could be used. In this way, extension set 140 provides a means of fluid infusion via the PIVC 400.

Unlike side branch 431, main branch 433 of side port member 430 is not coupled to elongated extension tubing. Instead, main branch 433 incorporates a connector portion 434 configured as, e.g., a needle-free connector such as the SMARTSITE™ needle-free connector from Becton Dickinson & Company. However, it is to be understood that connector portion 434 may be any appropriate needle-free connector, a PRN connector, etc.

Connector portion 434 is configured for direct coupling to a variety of devices utilized in blood draw via the PIVC 400. Similar to PIVC 300 described above with respect to FIG. 4, PIVC 400 is configured to reduce the likelihood of hemolysis during blood collection. However, rather than using an adapter coupled to an extension set and access port to accommodate blood draw as described above with respect to PIVC 300, PIVC 400 utilizes an adapter 435 having a proximal end which is directly coupled to the blood collection device 438. For example, the proximal end of the adapter 435 may be integrated with the blood collection device 438 or monolithically formed with the blood collection device 438 as a single unit. In another embodiment, the proximal end of the adapter 435 may include the female luer connector, which may be coupled with a male luer connector of the blood collection device 438. An example of adapter 435 and blood collection device 438 is shown and described in further detail in U.S. patent application Ser. No. 17/146,388, which is incorporated herein by reference in its entirety.

In some embodiments, the blood collection device 438 may include a needle assembly 437, which may include a needle configured to receive a blood collection container. In these and other embodiments, the blood collection container may include an evacuated blood collection tube. In some embodiments, the blood collection container may have all or a portion of air removed so pressure within the blood collection container is lower than ambient pressure.

In some embodiments, the blood collection device 438 may include or correspond to a luer lock access device, such as, e.g., the VACUTAINER® LUER-LOK™ Access Device from Becton, Dickinson and Company. Furthermore, in some embodiments, a proximal end of the needle assembly 437 may be enveloped within an elastomeric sheath. The elastomeric sheath may include an open distal end and a closed proximal end. In response to a blood collection container pushing the elastomeric sheath distally, the needle of needle assembly 437 may pierce the elastomeric sheath, and the needle may insert into a cavity of the blood collection container, drawing blood therein.

Similar to adapter 335 described above with respect to FIG. 4, adapter 435 of PIVC 400 is specifically configured to reduce a likelihood of hemolysis during blood collection. In some embodiments, the adapter 435 includes a distal end coupled to the connector portion 434 and a proximal end configured to couple to the blood collection device 438. The adapter 435 includes a fluid pathway disposed between the distal end and the proximal end thereof, with the fluid pathway having a non-linear portion. The non-linear portion of adapter 435 may facilitate increased flow resistance within the PIVC 400 to distribute the pressure differential and reduce shear stress experienced by red blood cells. In some embodiments, the non-linear portion of adapter 435 may form a coil (or spiral) shape, an S-shape, or another suitable non-linear shape. Furthermore, in some embodiments, the non-linear portion may increase a length of the fluid pathway through the adapter 435, and thereby may increase flow resistance and decrease blood flow within the adapter 435. In these embodiments, a risk of hemolysis during blood collection may be reduced.

Figure 6:
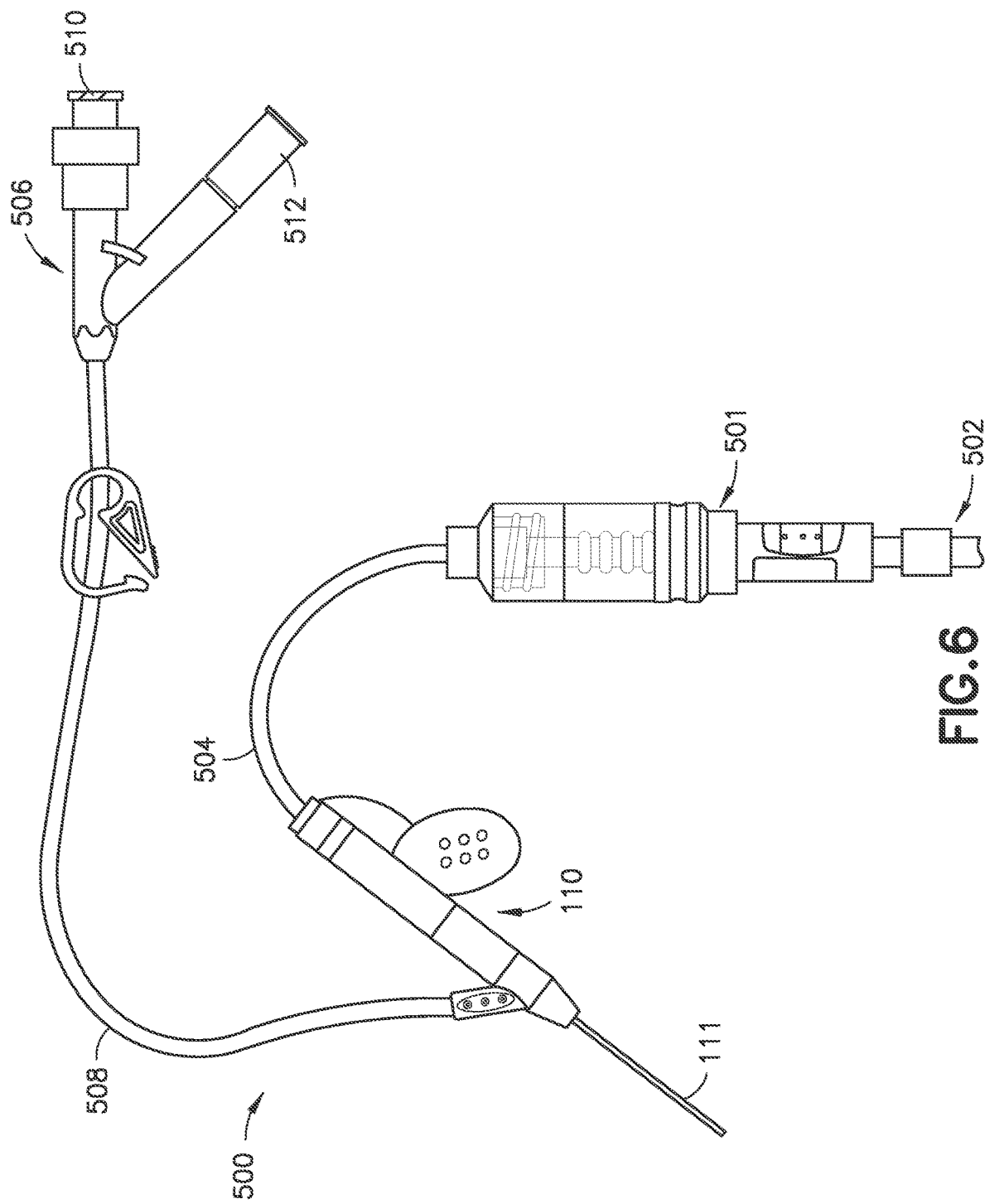
FIG. 6 illustrates an integrated PIVC having a blood draw adapter in-line with a catheter in accordance with another aspect of the present disclosure.

Referring now to FIG. 6, a PIVC 500 in accordance with another aspect of the present disclosure is illustrated. Similar to the various PIVC's described above with respect to FIGS. 1-5, PIVC 500 includes a catheter adapter 110 from which a catheter 111 distally extends and a needle assembly (not shown) from which a needle distally extends. The precise configuration and function of catheter adapter 110 and/or the needle assembly are not essential to the present disclosure, and any suitable configuration and/or interaction of these components may be employed.

PIVC 500 includes a blood draw adapter 501 and a luer lock access device 502, such as, e.g., the VACUTAINER® LUER-LOK™ Access Device from Becton, Dickinson and Company. The blood draw adapter 501 is configured to be coupled to the catheter adapter 110 in-line with the catheter 111 via tubing 504.

Additionally, in some embodiments, PIVC 500 may include an access port 506 having an air venting cap 512 located on a first branch and a connector 510 (e.g., a PRN, NAC, integrated connector, etc.), with the access port 506 being coupled to a side port of the catheter adapter 110 via tubing 508. While access port 506 is shown in FIG. 6 as having dual ports, it is to be understood that access port 506 may be configured to have a single port. In this way, the extension set provides a means of fluid infusion via the PIVC 500.

PIVC 500 enables blood draw at the time of placement of the catheter 111, with such blood draw being possible through the blood draw adapter 501 and luer lock access device 502, which are fluidly coupled with the catheter 111 at the time of placement. Conversely, during catheter indwell (i.e., after placement), the blood draw adapter 501 and luer lock access device 502 may be removed, thereby accommodating, e.g., a PIVO™ needle-less blood draw device for blood draw via the indwelling catheter at any time after catheter insertion. While not shown, the needle may be partially retracted within the catheter adapter 110 during catheter indwell.

Next, referring to FIG. 7, a PIVC 600 in accordance with another aspect of the present disclosure is illustrated. Similar to the various PIVC's described above with respect to FIGS. 1-6, PIVC 500 includes a catheter adapter 110 from which a catheter 111 distally extends and a needle assembly (not shown) from which a needle distally extends.

Like PIVC 500 described above with respect to FIG. 6, PIVC 600 includes a blood draw adapter 601 and a luer lock access device 602, such as, e.g., the VACUTAINER® LUER-LOK™ Access Device from Becton, Dickinson and Company. However, unlike PIVC 500, the blood draw adapter 601 of PIVC 600 is configured to be directly coupled to the catheter adapter 110 in-line with the catheter 111 (i.e., without intervening tubing). With such a configuration, the needle (not shown) utilized during insertion of the catheter 111 may be long such that it extends through the blood draw adapter 601 during placement of the catheter 111.

Additionally, in some embodiments, PIVC 600 may include an access port 606 having, e.g., an air venting cap located on a first branch and a connector (e.g., a PRN, NAC, integrated connector, etc.) on a second branch, with the access port 606 being coupled to a side port of the catheter adapter 110 via tubing 604.

PIVC 600 also enables blood draw at the time of placement of the catheter 111. After insertion of the catheter 111, the elongated needle (not shown) can be removed through the blood draw adapter 601, and the luer lock access device 602 may be coupled to the blood draw adapter 601 to allow for a blood draw at the time of catheter placement.

It is to be understood that the adapter(s) coupled to the side port member may be pre-attached and/or pre-packaged with the side port member in accordance with some embodiments of the present disclosure. However, in other embodiments, the side port member, adapter(s), and any other related componentry may be provided and/or packaged separately and attached by the end user.

While several embodiments of PIVCs capable of blood draw both at the time of catheter placement and during catheter indwell were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. An integrated peripheral intravenous (IV) catheter comprising:
   a catheter adapter comprising:
      a catheter configured to be inserted into a patient's vasculature, and
      a side inlet defining a fluid pathway into and out of the catheter;
   a side port member having a main branch, the main branch comprising a distal end configured to couple the side port member to the side inlet of the catheter adapter and a connector portion accessible via a proximal end of the main branch; and
   a blood collection adapter removably and directly coupled to the connector portion of the side port member at the proximal end of the main branch.

2. The integrated peripheral IV catheter of claim 1, further comprising a luer lock access device coupled to the blood collection adapter.

3. The integrated peripheral IV catheter of claim 2, wherein the luer lock access device comprises a needle assembly and blood collection container holder.

4. The integrated peripheral IV catheter of claim 1, wherein the connector portion is configured as a needle-free connector.

5. The integrated peripheral IV catheter of claim 1, wherein the connector portion is configured as a pro re nata (PRN) connector.

6. The integrated peripheral IV catheter of claim 1, wherein the main branch of the side port member provides a fluid pathway for drawing blood from the patient's vasculature.

7. The integrated peripheral IV catheter of claim 1, wherein the side port member further comprises a side branch.

8. The integrated peripheral IV catheter of claim 7, further comprising an extension set coupled to the side port member via the side branch.

9. The integrated peripheral IV catheter of claim 8, wherein the main branch of the side port member provides a first fluid pathway for drawing blood from a patient's vasculature and the side branch of the side port member provides a second fluid pathway for injecting fluids into the patient's vasculature.

10. The integrated peripheral IV catheter of claim 1, wherein the blood collection adapter comprises a fluid pathway having a non-linear portion.

11. The integrated peripheral IV catheter of claim 10, wherein the non-linear portion is one of a coil shape or an S-shape.

12. The integrated peripheral IV catheter of claim 10, wherein the blood collection adapter is coupled to an extension tube and an access port.

13. The integrated peripheral IV catheter of claim 10, wherein the blood collection adapter is directly coupled to a blood collection device.

14. The integrated peripheral IV catheter of claim 13, wherein the blood collection device comprises a needle assembly having a needle configured to receive a blood collection container.

15. An integrated peripheral intravenous (IV) catheter comprising:
   a catheter adapter comprising:
      a catheter configured to be inserted into a patient's vasculature, and
      a side inlet defining a fluid pathway into and out of the catheter;
   a side port member comprising:
      a main branch having a distal end configured to couple the side port member to the side inlet of the catheter adapter and a connector portion accessible via a proximal end of the main branch, and
      a side branch; and
   a blood collection adapter directly coupled to the connector portion of the side port member at the proximal end of the main branch.

16. The integrated peripheral IV catheter of claim 15, wherein the main branch of the side port member provides a first fluid pathway for drawing blood from a patient's vasculature and the side branch of the side port member provides a second fluid pathway for injecting fluids into the patient's vasculature.

17. The integrated peripheral IV catheter of claim 15, wherein the blood collection adapter is configured to allow for drawing of blood from a patient's vasculature at the time of catheter placement.

18. The integrated peripheral IV catheter of claim 17, wherein the blood collection adapter is selectively removable from the connector portion of the main branch of the side port member.

19. The integrated peripheral IV catheter of claim 15, further comprising a luer lock access device coupled to the blood collection adapter.

20. The integrated peripheral IV catheter of claim 15, wherein the blood collection adapter comprises a fluid pathway having a non-linear portion.

\* \* \* \* \*